Dec. 15, 1936.     A. J. HERSEY ET AL     2,064,205
TRACTOR
Filed April 25, 1936     3 Sheets-Sheet 3

Inventor
Arthur J. Hersey and
Charles L. Madden
By Caswell & Lagaard
Attorneys

Patented Dec. 15, 1936

2,064,205

UNITED STATES PATENT OFFICE 2,064,205

TRACTOR

Arthur J. Hersey and Charles L. Madden,
Minneapolis, Minn.

Application April 25, 1936, Serial No. 76,413

6 Claims. (Cl. 105—62)

Our invention relates to improvements in tractor vehicles and particularly, though not exclusively, to railway tractors and to the trucks thereof.

An object of the invention is to provide an improved vehicle construction of the present nature in which a four wheeled truck of simple and durable design is coupled with the source of power in such manner that equalized driving energy is efficiently transmitted to all of the wheels of the truck.

Another object of the invention resides in providing a vehicle construction in which the power is applied, first to the front wheels and from the front wheels to the rear wheels of the truck.

An object of the invention is to provide a construction, as aforesaid, in which braking power is directly applied to the rear wheels of the truck and transmitted from the rear wheels to the front wheels.

A feature of the invention resides in the provision of front wheels rotatable relative to each other and independently driven, and rear wheels fixed relative to a live axle, each of the latter being connected through a side rod with the corresponding front wheel.

A further object of the invention resides in the employment of an internal driving gear at the inner face of each of the front wheels of the truck and an internal brake at the inner face of each of the rear wheels.

Another object of the invention resides in the equalized transmission of energy to the front wheels from a source of power common to both thereof.

A feature of the invention resides in providing independent drive shafts for driving the front wheels of the truck and in utilizing an equalizer such as a differential for driving both of said drive shafts from a single power plant whereby equalized torque may be had on both of the wheels and equalized tooth pressure may be had on all the driving gears.

Other objects of the invention reside in the novel combination and arrangement of parts and in the details of construction hereinafter illustrated and/or described.

Figure 1:
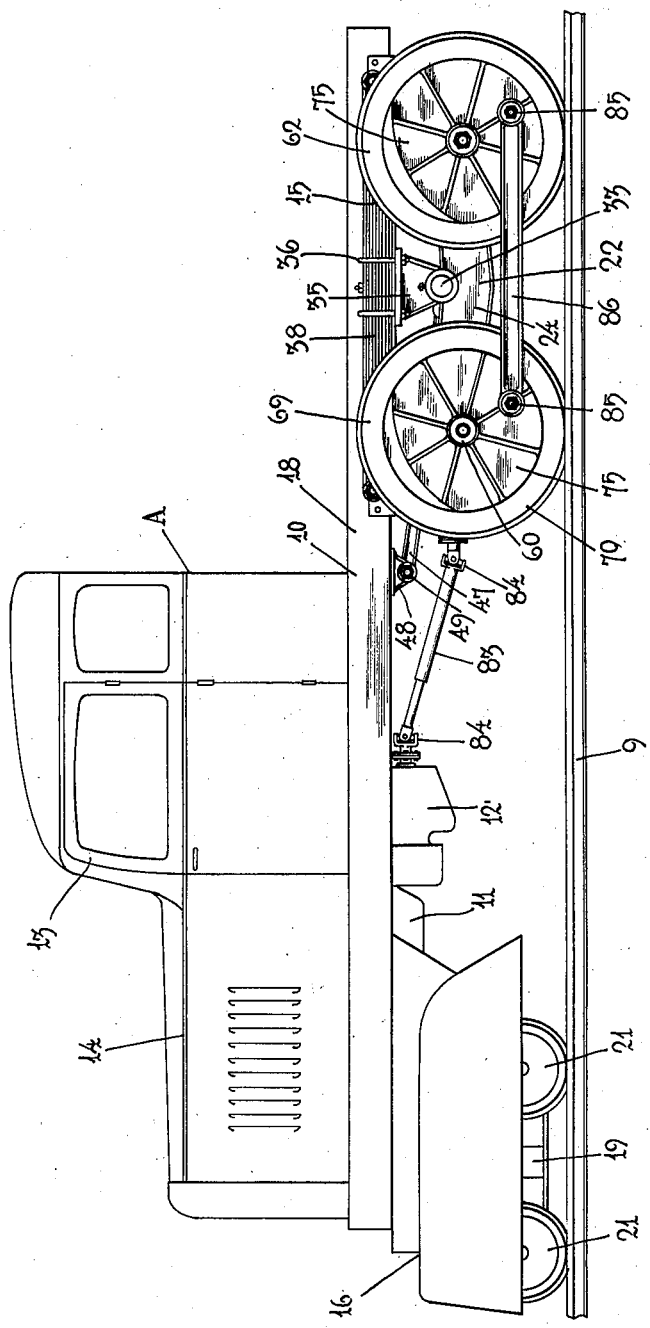
Fig. 1 is a side elevational view of a tractor illustrating an embodiment of my invention.

Our invention comprises a tractor indicated in its entirety by the reference character A. Our invention can be used for either railway or road service and for the purpose of illustration, the tractor has been shown as adapted for railway service. In the drawings, we have shown rails 9 on which the tractor is carried and which may be of conventional construction. The said rails forming no feature of the invention will not be described in detail.

The tractor A comprises a tractor frame 10 which includes two longitudinal frame members 17 and 18 secured together in any suitable manner by means of cross frame members, not shown. The frame 10 carries a power plant 11 and power transmission 12 at the forward end thereof. The operator is stationed within a cab 13 of usual construction and the power plant 11 is enclosed within a hood 14. The frame 10 is supported on a rear truck 15 and a pilot truck 16. These various parts will now be described in detail.

The particular construction of the truck 16 forms no feature of the invention and the same will not be described in detail in this application. This truck consists generally of a truck frame 19 which rotatably supports four front wheels 21. The wheels 21 are journaled in suitable bearings in the truck frame 19 and ride on the rails 9. Frame 19 is swivelly connected to the tractor frame 10 in the customary manner, which construction has not been shown. As will become evident, any suitable front truck construction can be employed and, if desired, a single pair of front wheels may be employed instead of the truck shown.

Figure 2:
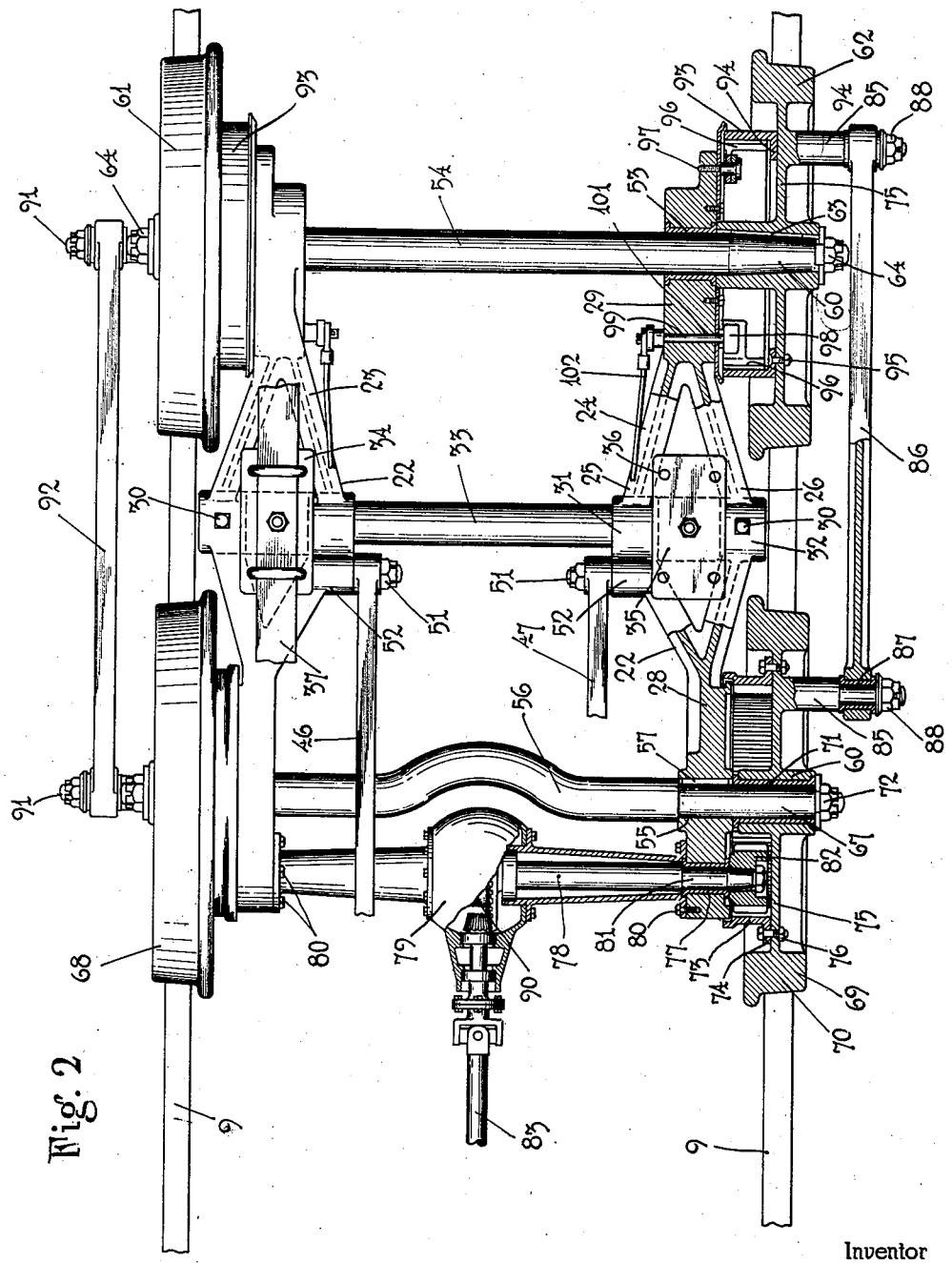
Fig. 2 is a plan view of the truck of the invention shown in Fig. 1 with parts thereof illustrated in section.
Figure 3:
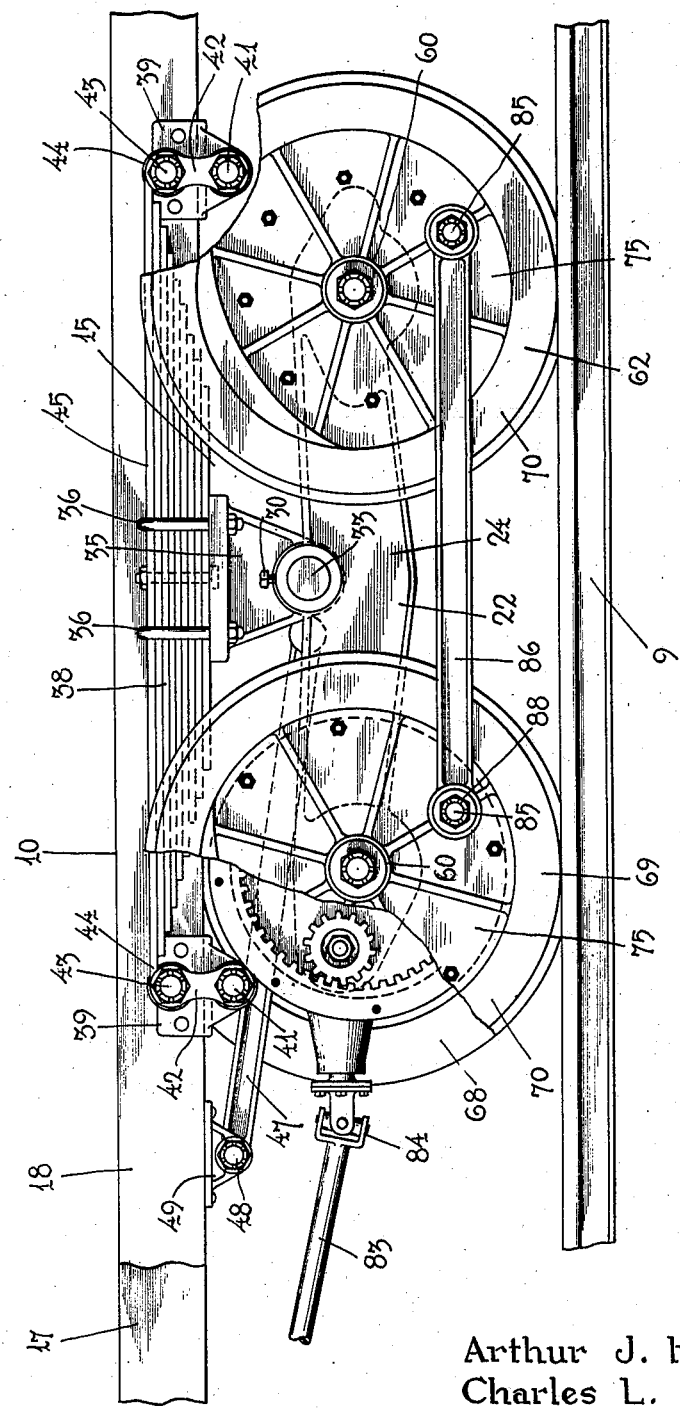
Fig. 3 is a side elevational view of the structure shown in Fig. 2 with portions thereof cut away.

The truck 15 comprises a frame 22 which consists of two longitudinal frame members 23 and 24. These frame members are identical excepting that one is left handed and the other right handed and only the frame member 24 will be described in detail. This frame member is diamond shape in construction, as shown in Fig. 2, and consists of spaced reaches 25 and 26 which are connected together at their ends through frame portions 28 and 29. The reaches 25 and 26 are provided with bearings 31 and 32 in which is mounted a cross frame member 33 in the form of a shaft. Set screws 30 threaded in said bearings hold the frame member 33 in position. The frame member 33 has journaled on it two spring saddles or seats 34 and 35 which are disposed between the reaches 25 and 26. Two springs 37 and 38 are attached to the saddles 34 and 35 by means of U bolts 36. These springs are of the semi-elliptical type and are attached to the frame members 17 and 18 by means of a construction best shown in Fig. 3. This construction utilizes four brackets 39 which are bolted to said frame members and which are constructed with studs 41 extending outwardly therefrom. Shackles 42 are pivoted to said studs and are also pivoted to pins 43 which extend through eyes 44 formed in the uppermost leaves 45 of the springs 37 and 38.

Inasmuch as both ends of the springs 37 and 38 are connected on shackles, two tie rods 46 and 47 are employed which serve the same purpose as the radius rod frequently used with automobiles. These tie rods are pivoted at their forward ends by means of bolts 48 to bearings 49 attached to frame members 17 and 18 and are further pivoted at their rearward ends on studs 51 issuing outwardly from bosses 52 on the reaches 25 of frame members 23 and 24.

The truck 15 includes four wheels 61, 62, 68, and 69 which are supported as will be presently described. These wheels are constructed with ribbed webs 75, hubs 60 and rims 70 adapted to ride upon the rails 9.

The portions 29 of frame members 23 and 24 are constructed with bearings 53 which rotatably support a live axle 54. The portion 28 of said frame members are bored as indicated at 55 to receive and support a dead axle 56. This axle is keyed to said portions of the frame members 23 and 24 by means of keys 57. The live axle 54 is constructed with conical portions 60 which extend outwardly beyond the bearings 53. On these conical portions are mounted the two trailing wheels 61 and 62 which are rigidly secured to the same by means of keys 63. The said wheels are held in position thereon by means of nuts 64 screwed upon the ends of said axle. These two wheels are both fixed with respect to the axle 54 and rotate in unison therewith. The axle 56 is constructed with portions 67 which project outwardly beyond the portions 28 of frame members 23 and 24. On such portions of the axle are rotatably mounted the two leading wheels 68 and 69. These wheels are provided with bearings 71 which ride upon the portions 67 of the axle 56. These wheels are held in position by means of nuts 72 which are screwed upon the extreme ends of said axle and are held thereby from axial movement along said axle. It will become readily apparent that wheels 68 and 69 are independently rotatable on the axle 56.

Wheels 68 and 69 are driven in the following manner. For the purpose, each of these wheels is provided with an internal ring gear 73. These ring gears are each constructed with a flange 74, which flanges are bolted to the webs 75 of the respective wheels 68 and 69, by means of bolts 76. The portions 28 of the frame members 23 and 24 are both provided with bearings 77 which journal two drive shafts 78. These drive shafts are further journaled in a housing 79 which is similar to the rear axle housing of an ordinary motor vehicle. This housing is attached to the portions 28 of frame members 23 and 24 by means of bolts 80. The two shafts 78 are identical and only the shaft associated with wheel 69 will be described in detail. This shaft has a reduced portion 81 at its end which extends through and outwardly beyond the bearing 77 and has secured to it a spur pinion 82 which meshes with the internal gear 73. The two shafts 78 are driven by means of a differential transmission 90 of standard construction which is mounted within the housing 79. The construction of the differential being well known in the art, will not be described in detail. This differential mechanism is driven by a telescoping propeller shaft 83 which in turn is driven from the transmission 12 associated with the power plant 11. The propeller shaft 83 is connected to the differential mechanism and the transmission 12 by means of universal joints 84 so that power may be applied to the wheels without interfering with the action of the springs 37 and 38. The shaft 78 associated with wheel 68 also drives the said wheel in identically the same manner. It will thus be seen that the two wheels 68 and 69 are driven independently from the same source of power and through the differential 90 within the housing 79.

Power is applied to the two trailing wheels 61 and 62 from the front wheels 68 and 69. This is accomplished as follows: Issuing outwardly from the webs 75 of the wheels 62 and 69 are crank pins 85 similar to those used on the drivers of steam locomotives, which crank pins have connected to them a side rod 86. This side rod is provided at its ends with bearings 87 through which the crank pins 85 extend. Nuts 88 screwed upon the extreme ends of the crank pins 85 retain the side rod 86 in position. The wheels 61 and 68 are also provided with crank pins 91 identical with the crank pins 85 but the latter crank pins are disposed 90° from the crank pins 85. These crank pins have connected to them a side rod 92 identical with the side rod 86. By means of this construction power is transmitted from the wheels 68 and 69 to the wheels 61 and 62. Due to the differential mechanism used for driving the drive shafts 78 equal torque is procured at all four wheels and the tooth pressure between the pinions 82 and the gears 73 is equalized for both sets of gears.

To provide braking for the tractor the two wheels 61 and 62 are provided with brake drums 93. These brake drums are constructed with flanges 94 which extend inwardly therefrom and are attached to the webs 75 of the wheels 61 and 62 by means of bolts 95. Within the said brake drums are mounted brake shoes 96 which are anchored to the portions 29 of frame members 23 and 24 by means of bolts 97. Cam expanders 98 are disposed between the ends of the brake shoes 96 and expand the same to cause frictional engagement with the inner surfaces of the drums 93. Expanders 98 are mounted on shafts 99 which are journaled in bearings 101 formed in the portions 29 of frame members 23 and 24. These shafts are operated by means of any suitable linkage such as indicated at 102, and which extends up to the cab 13 where the brakes may be manipulated by the operator in the customary manner.

The use of our invention is as follows: A suitable draw bar may be connected to the tractor frame 10 and trailer cars drawn by means of the same. If desired, a fifth wheel may be attached to the frame 10 and the rearward portion of the tractor used to support the forward portion of a trailer having only rear wheels or a rear truck. Such particular construction being well known in the art has not been illustrated in this application.

The advantages of our invention are manifest. Equalized traction at all four wheels of the rear truck is afforded. With our invention equalized tooth pressure on both sets of driving gears is procured so that the gears can be constructed considerably lighter than would ordinarily be possible. The invention adapts itself to the use of standard automotive construction such as is now used for automobiles. With our invention the power is applied to the leading wheels of the truck and braking applied to the rear wheels and the power and braking effort so applied is transmitted through the side rods to the other sets of wheels. Thus both power and braking is uniformly transmitted to all four wheels.

Changes in the specific form of our invention, as herein disclosed, may be made within the scope of what is claimed without departing from the spirit of our invention.

Having described our invention, what we claim as new and desire to protect by Letters Patent is:

1. A tractor having a frame and a rear driving truck provided with a rigid frame including side frame members and spaced cross frame members, one a dead axle and another a tractor frame supporting member, both of said cross frame members being rigidly secured to said side frame members, a live axle journaled in said side frame members, a set of wheels fixed to the live axle, a second set of wheels journaled on the dead axle, side rods connecting the corresponding wheels of said two sets, said side rods having crank pins on each set of wheels relatively angularly disposed, said tractor having a propeller shaft, and power transmission means geared to said propeller shaft and to the wheels on said dead axle, a housing for said power transmission means having opposed branches, one branch being secured to one truck side frame member and the other branch to the second truck side frame member, said housing being disposed to one side of the dead axle opposite said tractor frame supporting member and constituting a third cross frame member.

2. A tractor having a frame and a rear driving truck, said truck comprising side frame members, a dead front axle rigidly secured to the truck frame members, a live rear axle journaled in said frame members, an intermediate cross frame member rigidly secured to said truck frame members, saddles on said intermediate cross frame member, springs supporting the tractor frame and bearing upon said saddles, said cross frame member being rockable relative to said saddles, a set of wheels fixed to the live axle, a second set of wheels independently journaled on the dead axle, power transmission means connecting the corresponding wheels of said two sets of wheels, a pair of drive shafts, one for each independently journaled wheel, each shaft being journaled in the truck side frame corresponding with its respective wheel and geared to such wheel, said tractor having a propeller shaft, and equalizing power transmission means interposed between the propeller shaft and said drive shafts.

3. A tractor having a frame and a rear driving truck provided with a rigid frame including side frame members and spaced cross frame members, one a dead axle and another a tractor frame supporting member, both of said cross frame members being rigidly secured to said side frame members, a live axle journaled in said side frame members, a set of wheels fixed to the live axle, a second set of wheels journaled on the dead axle, side rods connecting the corresponding wheels of said two sets, said side rods having crank pins on each set of wheels relatively angularly disposed, said tractor having a propeller shaft, and power transmission means geared to said propeller shaft and to the wheels on said dead axle.

4. A tractor having a rear driving truck comprising a frame, a set of wheels independently journaled on the frame, a live axle journaled in the frame, a second set of wheels fixed to the live axle, side rods connecting the corresponding wheels of said two sets, drive shafts, one for each independently journaled wheel, each shaft being geared to its respective wheel, said tractor having a propeller shaft, and a power equalizing connection between said propeller shaft and said drive shafts.

5. A tractor having a rear driving truck comprising a frame, a set of wheels independently journaled on the frame, a live axle journaled in the frame, a second set of wheels fixed to the live axle, side rods connecting the corresponding wheels of said two sets, said side rods having crank pins on each set of wheels relatively angularly disposed, said tractor having a propeller shaft geared to each of said independently journaled wheels.

6. A tractor having a rear driving truck comprising a frame, a set of wheels independently journaled on the frame, a live axle journaled in the frame, a second set of wheels fixed to the live axle, power transmitting means connecting the corresponding wheels of said two sets, said tractor having a propeller shaft geared to each of said independently journaled wheels.

ARTHUR J. HERSEY.
CHARLES L. MADDEN.